United States Patent [19]
Caldarone

[11] Patent Number: 6,036,082
[45] Date of Patent: Mar. 14, 2000

[54] WELDING STATION

[75] Inventor: Andrew Caldarone, Mentor, Ohio

[73] Assignee: Lincoln Global, Inc., Cleveland, Ohio

[21] Appl. No.: 09/070,890

[22] Filed: May 1, 1998

[51] Int. Cl.[7] .......................... B23K 37/047; B23K 37/04
[52] U.S. Cl. ........................ 228/212; 228/44.3; 228/47.1
[58] Field of Search ................................ 228/47.1, 49.1, 228/44.3, 212

[56] References Cited

U.S. PATENT DOCUMENTS

| 516,980 | 3/1894 | Taylor | 228/44.3 |
|---|---|---|---|
| 3,872,815 | 3/1975 | Kawai et al. | 228/47.1 |
| 4,152,566 | 5/1979 | Mägerle | 228/47.1 |

FOREIGN PATENT DOCUMENTS

| 2236270 | 4/1991 | United Kingdom | 228/49.1 |
|---|---|---|---|

*Primary Examiner*—Patrick Ryan
*Assistant Examiner*—Jeffrey T. Knapp
*Attorney, Agent, or Firm*—Vickers, Daniel & Young

[57] ABSTRACT

A robotic welder designed to efficiently weld a workpiece together which includes a three-sided structure to support a plurality of workpiece components, and an index and rotating mechanism designed to move the work support surfaces into a desired position. The welding system is designed to minimize idle time of the welding operations and to increase the efficiencies of the operators during the operation of the welding system.

49 Claims, 6 Drawing Sheets

WELDING STATION

The invention relates to the art of welding and, more particularly, to a welding station designed to efficiently weld large objects.

BACKGROUND OF THE INVENTION

The use of robotics to perform welding operations is well known. Typically, robotics are used to increase production and/or to reduce human exposure to harsh and/or undesirable working conditions. One such environment is the welding of large door frames. Such door frames are difficult to assemble due to their overall size and weight. Many metal door frames are over six feet long and over two feet wide, thereby creating difficulties in loading the door components properly for welding and unloading the welded door frame without damaging the door frame. A standard metal door frame includes several components, such as longitudinal rails and transverse rails. These longitudinal rails are normally over six feet long while the transverse rails are normally over two feet long. When the door components are welded together, a complete door frame is produced.

The quality of the welded door frame is influenced by several factors. These factors include the accuracy of the position of the door frame components relative to one another, the ability of the welding head to be properly positioned with respect to the door frame components, and the manner by which the welded door frame is removed from the work area. If the door components are not properly positioned relative to one another, the welded door frame will have dimensional quality problems. If the welded door frame is not carefully and properly removed from the welding platform, the door frame can be bent or otherwise damaged. Furthermore, if the welding head of the welder is not properly positioned with respect to the door frame components during the welding, the integrity of the welded joint may be defective compromised.

One of the problems associated with the use of a robotic welder to position the weld head on the door frame components during welding is that the robot is typically "blind." As a result, the robotic welder is unable to ascertain the location of the door components on the work surface. Consequently, the robotic welder is completely dependent on the door frame components being accurately and consistently positioned on the work surface during the welding process so that a quality door frame is produced.

Another problem associated with the use of robotic welders is that robotic welders are costly, thereby making effective utilization of such robotic welders necessary in order to justify the cost of using such a welder. Therefore, wasteful idle time of the robotic welder should be minimized. One of the primary sources of idle time is attributable to manual tasks performed by an operator during the welding process (i.e. loading and unloading the door components). Typically, a robotic welder is able to weld the door frame components within the time necessary for an operator to load the door frame components onto the work surface. However, significant idle time results when the operator loads the door components onto the work surface and unloads the welded door frame from the work surface after the robotic welder has welded the door components together. Such idle time reduces production rates and does not optimize the use of the robotic welder.

Several attempts have been made to reduce the problems associated with the idle time of the robotic welder. These past attempts involved the design of welding systems that allow an operator to unload the welded door assembly and/or load the door components onto the work surface while the robotic welder is welding the door frame component. These designs reduce idle time by having the robotic welder weld the door frame components together while the operator spends time loading the door components onto the work surface and/or removing the welded door from the work surface.

One type of welding system which utilizes an improved welding system utilizes a rotary work table which work table is rotatable about a vertical axis. This configuration allows for multiple work stations to be positioned about the rotary work table. The work table includes two work surfaces and is mechanically rotated to move the door components from the operator's work station to the robotic welder work station and then to move the welded door frame assembly back to the operator's work station. The rotating work table allows the operator to unload a welded door assembly and load the door components onto the work table while the robotic welder is welding the previously loaded door components. Although this welding system reduces idle time of the robotic welder, the welding system has several disadvantages. One disadvantage is the size of the work table needed to rotate large workpieces. Door frame components which must lay flat on the work table require the work table to be over six feet tall or six feet wide to accommodate the door frame. The difficulty in loading the door frame components onto the work table results additional idle time of the robotic welder. The manipulation of the large door components onto the work surface requires extensive bending and reaching movements by the operator to position the door components onto the work surface. The difficulty in removing the welded door frame from the work table also results in additional idle time of the robotic welder and can result in damage to the door frame. Furthermore, the work table configuration requires one work station to be used both as an unloading station and as a loading station. The time required to unload a welded door frame assembly and then to load the door components onto the work table results in significant idle time of the robotic welder. Another disadvantage of this welding system is that the door components are welded in a vertical position. In many welding applications, the vertical welding position does not create the optimum type of weld bead on the welded components. The inability of the welding system to weld at various welding positions limits the versatility of the welding system.

Another type of welding system which reduces idle time is a welding system which incorporates the use of multiple independent work tables. These work tables are generally stationary and require the robotic welder and the operator to move back and forth between the independent work tables. Typically, there are two independent work tables located on opposite sides of the robotic welder. The robotic welder performs the welding operation on one work table while the operator unloads a welded door frame and subsequently loads the door frame components on the second work table. Once the door components are loaded onto the second work table, the robotic welder moves to the second work table to begin welding the door components and the operator moves to the first work support table to remove the welded door frame and to then load the door components for later welding. These operations are repeated requiring both the operator and the robotic welder to move from one work table to another. Although this welding system does reduce the idle time of the robotic welder, the welding system has many disadvantages. One of the disadvantages associated with this welding system is that the operator must continuously move between the two work stations during the welding process. This movement between the two work tables is time consuming, results in increased operator fatigue which can thereby affect the quality and quantity of production. The movement of the robotic welder between two tables makes it difficult to shield the operator from "arc flash." Arc flash can cause irritation to the eyes over time. Furthermore, the time taken by the operator moving from one work table to another results in increased idle time of the robotic welder. To overcome this problem, two operators may be used; however, the use of more than one operator results in increased labor costs. Another disadvantage of this welding system is that the robotic welder must also move between the two work tables during the welding process. The movement of the robotic welder between two work tables results in additional idle time of the welder, and requires additional components to move the robotic welder between the two work tables thus resulting in a more complex and costly design. The multiple work tables also can result in reduced quality and consistency of the welded door frames. Because the robotic welder must move between two independent work tables, the positioning of the door components at the different work tables must be exact to ensure consistency and quality of the door frames. Therefore, the indexing mechanism for moving the robotic welder between the two work tables must be continuously serviced to ensure such accuracy. Such servicing results in down time thus reduced the quantity of welded door frames and also increases the cost of operating the robotic welder. In addition, the movement of the robotic welder between the two work tables also results in increased wear on the movement mechanisms of the robotic welder thereby increasing costs and reducing output efficiencies. Another disadvantage of the welding system is that the work surfaces are positioned parallel to the floor. The positions of the work surfaces can cause delays in loading the door components onto the work surface since the operator must walk around the work surface to position the components onto the work surface. This also causes operator fatigue due to excessive reaching over the surface to load the components. In addition, the position of the work surface only allows for down position welding thus limiting the versatility of the types of welds which can be formed.

In view of the deficiencies of prior robotic welding systems, there is a demand for a welding system which increases the ergonomics of the welding system without increasing idle time, which allows for welding at multiple angles, maintains the consistency of the welded product, and is relatively simple and cost effective to operate.

SUMMARY OF THE INVENTION

The present invention relates to a welding system which is designed to efficiently and cost effectively weld components of a workpiece together; and more particularly, to a welding system which incorporates a welder to weld large flat objects, such as door frames, together in a cost effective and efficient manner to produce a high quality welded product. The present invention finds particular utility in welding large flat objects, such as door frames and, accordingly, is disclosed and described in detail hereinafter in connection with such use. However, it will be appreciated that the invention is applicable to other semi-automatic and fully automatic welding or assembly operations for welding a variety of objects.

In accordance with the principal aspect of the present invention, a welding system is designed to improve the efficiency and effectiveness of welding, while minimizing idle time and operator fatigue in connection with the operation thereof. More particularly, the present invention pertains to a welding system for welding large objects such as door frames by utilizing a unique work support device which efficiently positions the components of a workpiece and transfers such components to a location for welding in a manner which reduces idle time of the welder and minimizes fatigue related to operator movement.

In accordance with another aspect of the present invention, there is provided a welding table arrangement which includes a welding table having a plurality of work surfaces. The welding table arrangement includes a mechanism to rotate the welding table about the longitudinal axis of the welding table. Preferably, the longitudinal axis extends generally parallel to one or more of the work surfaces. In addition, the longitudinal axis of the work table is generally parallel to the ground surface on which the welding table arrangement lays.

In accordance with yet another aspect of the present invention, there is provided a welding table arrangement which includes a index mechanism designed to index the welding table about the longitudinal axis of the welding table to thereby position at least one of the work surfaces from a loading station to a welding station. A loading station is referred to in this invention as a location wherein an operator or an automated device loads one or more workpiece components onto a work surface of the welding table. Preferably the workpiece components are positioned and secured in place in a desired configuration at the loading station. However, as can be appreciated, the final positioning of the workpiece components may be completed at other locations such as at the welding station. The welding station is referred to in this invention as a location wherein the components of the workpiece are welded together. The welding of the workpiece components may be performed by a robotic welder and/or by manual welding.

In accordance with still another aspect of the present invention, the welding table has three work surfaces. In one preferred embodiment, the welding table has a triangular cross-sectional shape. In another preferred embodiment, the size and cross-section shape of the welding table is substantially uniform along the longitudinal axis of the welding table. In still another preferred embodiment, the three work support surfaces are spaced at a substantially equal distance from one another to form a cross-sectional shape of the work table which substantially resembles an equilateral triangle. In yet another preferred embodiment, each work surface is substantially flat. In another preferred embodiment, the work surfaces are polygonal, preferably rectangular, and which length is longest along the longitudinal axis of the work surface.

In accordance with still yet another aspect of the present invention, the index mechanism is designed to position at least one of the work surfaces at the welding station, and preferably all of the work surfaces, at an angle with respect to the vertical axis of the welding table to produce a weld bead by the welding device which weld bead has the desired characteristics. In a preferred embodiment, the vertical axis of the welding table is substantially perpendicular to the longitudinal axis of the welding table. In addition, the vertical axis is generally perpendicular to the ground surface on which the welding table arrangement lays. The desired angle of welding together a particular set of work piece components is a function of several factors, such as the type of materials forming the workpiece, the shape of the workpiece components, the type of welding to be used (i.e. TIG, MIG, etc.) and/or the type of flux system or electrode to be used. Therefore, the selected angle of welding can have a significant impact on the quality of the weld and the weld bead. When welding metal door frames, it has been found that a welding angle of 0–60° when measured from the offset from the vertical axis of the work table produce a high quality weld and weld bead. In many applications, it has been found that the optimum welding angle is about 30–50° offset from the vertical axis of the welding table and more preferably about a 45° offset from the vertical axis of the welding table.

In accordance with still another aspect of the present invention, the work table is designed so that the workpiece components can be loaded onto the work surface at the loading station at the same time the workpiece components are being welded together at the welding station.

In accordance with another aspect of the present invention, the index mechanism positions at least one work surface, and preferably all work surfaces, at an angle in the loading station which enables the operator to conveniently and easily load the components of the workpiece onto the work surface. The components of a workpiece, such as for a door frame, include several large components which can make the task of positioning the workpiece components onto the work surface very difficult. In order to minimize the difficulty of loading the workpiece components onto the work surface, the work surfaces are designed to accommodate the longest workpiece component along the longitudinal plane of the work surface. The longitudinal plane of the work surface is generally parallel to the longitudinal axis of the work table. For workpiece components for door frames, the longitudinal rails can be over six feet in length for such components. The work surface is constructed so that the longitudinal rails can be positioned generally parallel to the longitudinal plane of the work surface. In one preferred embodiment, the angle of the work surface is selected to minimize the time necessary to load the workpiece components onto the work surface. A workpiece such as a door frame can be over three feet wide. If the work surface is flat, an operator typically needs to reach to the far side of the work surface to load all the workpiece components. However, when the work surface is positioned at an angle relative to the vertical axis of the work table, the movement of the operator can be reduced during the loading process. By selecting a particular angle of the work surface at the loading station, an operator is able to load all the workpiece components without having to reach excessively. For door frame components, the work surface is preferably at an able of about 0–60° offset from the vertical axis of the work table. In another preferred embodiment, the work surface is positioned at an angle at the loading station so that once the work piece components are positioned on the work surface, the components remain stationary on the work surface. A work surface positioned at an angle having little or no offset from the vertical axis of the work table can result in the workpiece components to shift out of position or fall off the work surface after the components are placed on the work surface. This shifting or failing of the components results in additional time to position the workpiece components onto the work surface, thereby resulting in an increase in idle time and possible damage to the workpiece components. Therefore, the work surface at the loading station is preferably offset from the vertical axis of the work table at an angle of up to about 5–60°. The optimum angle selected for the work surface at the loading station is one which allows the operator to easily load the workpiece components onto the work surface, minimizes the movement of the operator during the loading process, and supports the workpiece components on the work surface.

In accordance with still another aspect of the present invention, a robotic welder is used to partially or totally weld the workpiece components together. The robotic welder includes a robotic arm to position the welding head at the workpiece components to be welded. The use of this robotic arm increases the speed and consistency of the weld, reduces operator fatigue, thereby making the welding operation efficient without sacrificing consistency and quality. The use of a robotic welder reduces exposure of an operation to the welding process, thereby reducing the risk of injury to an operator. A robotic welder typically utilizes computerized controls to electronically move the welding head of a welder to and from a desired position to thereby weld the workpiece components. In one preferred embodiment, the computer controls for moving the robotic arm of the welder are manually initiated by an operator once the work surface is properly positioned at the welding station. Alternatively, the computer controls of the robotic arm of the welder upon detecting that the work surface is properly positioned at the work station. The computerized controls are preferably designed to initiate the welding process, regulates the position of the robotic arm, regulates the feed rate of the electrodes if one is used, regulates the feed rate of the flux if used, regulates the welding parameters during welding. The computer controls may also monitor the welding process to ensure a quality weld and indicate when a defective welded workpiece has been produced. By utilizing a computer controlled robotic welder, the welding process can be quickly performed to produce a consistent and quality welded workpiece with minimal operation interaction.

In accordance with still yet another aspect of the present invention, the welding table arrangement includes an unloading station which has a separate and distinct location from the loading station and welding station. An unloading station is referred to in this invention as a location where the welded workpiece is unloaded from the work surface. In one embodiment, the index mechanism rotates the work table until the work surface is positioned from the welding station to the unloading station. In another preferred embodiment, the index mechanism positions the work surface at the unloading station such that the work surface is offset from the horizontal axis of the work table at an angle of about 0–30°. In another preferred embodiment, the weld table is rotated so that the workpiece components are moved from the loading station to the welding station to be welded, the welding table is then rotated to move the welding surface from the welding station to the unloading station to be unloaded from the work surface, and then the welding table is rotated to move the work surface from the unloading station back to the loading station to be reloaded with the workpiece components.

In accordance with yet another aspect of the present invention, the welding table system includes a shielding arrangement to prevent materials, such as spatter formed in the welding process, from interfering with the operations occurring at the loading station and/or unloading station. During the welding of the workpiece components, spattering may occur resulting in flux components and/or molten metal being propelled from the welding station. These materials resulting from spatter can be projected to the loading station and/or unloading station and to be deposited on the workpiece components. Such deposits may interfere with the positioning of the workpiece components at the loading station and/or damage or disfigure one or more workpiece components at the loading station and/or unloading station. In addition, the hot materials from the spatter can interfere with the efficiencies of the operators during the loading of the workpiece components onto the work surface and/or removing the welded workpiece from the work surface. The shielding arrangement is designed to reduce the amount of spatter that traverses from the welding station to the loading station and/or unloading station. In one arrangement, a shield is positioned substantially at the intersecting ends of two adjacent work surfaces and extends vertically therefrom. The shield acts as a barrier to block materials, resulting from spatter, from traversing from the welding station to the loading station and/or unloading station.

In accordance with still another aspect of the present invention, a clamping mechanism is provided on the work surface to secure the workpiece components in position on the work surface and to maintain the workpiece components in position during the welding process. In order to manufacture a quality door frame, each component of the door frame must be properly aligned with the adjoining components. These components must further be held in position during the welding process to produce a quality door frame. The clamping mechanism may include brackets, positioning tabs and the like to secure and align the workpiece components on the work surface. In a particular embodiment, the clamps and/or pins are designed to be movable, such as by hydraulics, gears, screws, springs or the like, to move the workpiece components into a final pre-weld position and/or to retract from one or more of the workpiece components. In a preferred embodiment, the clamping mechanism allows the welded and nonwelded door frame to be easily removed from and/or positioned on the work surface without the use of costly mechanisms. The clamping mechanism is also preferably designed to be easily modified to support a variety of differently shaped workpieces.

In accordance with another aspect of the present invention, a conveyor system is provided to transport workpiece components to the loading station and/or to remove the welded workpiece from the unloading station. In a fully automated welding system, a conveyor system is provided to transport the workpiece components to the loading station. At the loading station, robotic arms or the like are used to position the workpiece components onto the work surface. In a semi-automatic welding system, a conveyor may be used to transport the workpiece components to the loading station whereby an operator manually positions the workpiece components onto the work surface. If a conveyor is used at the unloading station, the conveyor is preferably positioned under the work surface so as to receive the welded workpiece once the workpiece is released from the work support surface. In one particular embodiment, the welded workpiece is automatically released from the work support surface once the work support surface has been properly positioned over the conveyor. Alternatively, the welded workpiece may be manually removed from the work surface and positioned on the conveyor. In another embodiment, a portion of the conveyor is designed to move toward the work surface to thereby minimize the distance the welded workpiece must travel to the surface of the conveyor. Once the workpiece is positioned on the conveyor, the conveyor may be designed to retract the movable portion so that the welded workpiece can be transported away by the remaining portion of the conveyor system.

In accordance with still another aspect of the present invention, a shield structure is positioned above the rotating weld table. The shielding structure is designed to reduce the amount of spatter created at the welding station from traversing from the welding station to the loading station and/or unloading station. A shield structure may be used as the sole shielding device or may be used in conjunction with other shielding structures positioned on or about the work surfaces.

In accordance with still yet another aspect of the present invention, a welder index mechanism is provided to position the robotic welder in a pre-defined position with respect to the workpiece components so that the welding head of the welder engages the components of the workpiece during the welding process and then retracts the welding head from the welded workpiece after the welding process is completed. Preferably, the welder index mechanism is computer controlled so as to maintain the consistency and quality of the welding process from one workpiece to another.

The primary object of the present invention is to provide an improved work table arrangement for use with a robotic welder.

Another object of the present invention is to provide a welding system which reduces the idle time of the robotic welder.

Yet another object of the present invention is to provide a welding system which minimizes operator inefficiencies and provides a simple and cost effective mechanism to produce consistent high quality welded workpieces.

Still yet another object of the present invention is to provide a welding system which simplifies the loading of workpiece components onto a work surface.

Another object of the present invention is to provide a welding system which positions the workpiece at an angle to produce a high quality weld bead.

Still yet another object of the present invention is to provide a welding system which reduces spatter and/or "arc flash" from interfering with the various operations of the welder system.

Still another object of the present invention is to position the work surface to optimize the loading of the workpiece components, the welding of the workpiece components and/or the unloading of the workpiece components.

Yet another object of the present invention is to provide a welding system which minimizes the floor space utilized.

Yet another object of the present invention is to provide a welding system which minimizes operator movement during the loading and/or unloading of the workpiece from the work surfaces.

Still another object of the present invention is to provide a welding system which allows for the loading of workpiece components on a work surface at a loading station while simultaneously welding workpiece components at a welding station.

Another object of the present invention is to provide a welding system which is economical to operate.

Still yet another object of the present invention is to provide a work support which reduces idle time while minimizing wasteful movements of the robotic welder and/ or the operator.

These and other objects and advantages will become apparent to those skilled in the art upon reading the following description taken together with the accompanying drawings.

BRIEF DESCRIPTION OF THE DRAWINGS

Reference may now be made to the drawings, which illustrate various embodiments that the invention may take in physical form and in certain parts and arrangements of parts wherein.

DETAILED DESCRIPTION OF PREFERRED EMBODIMENT

Figure 1:
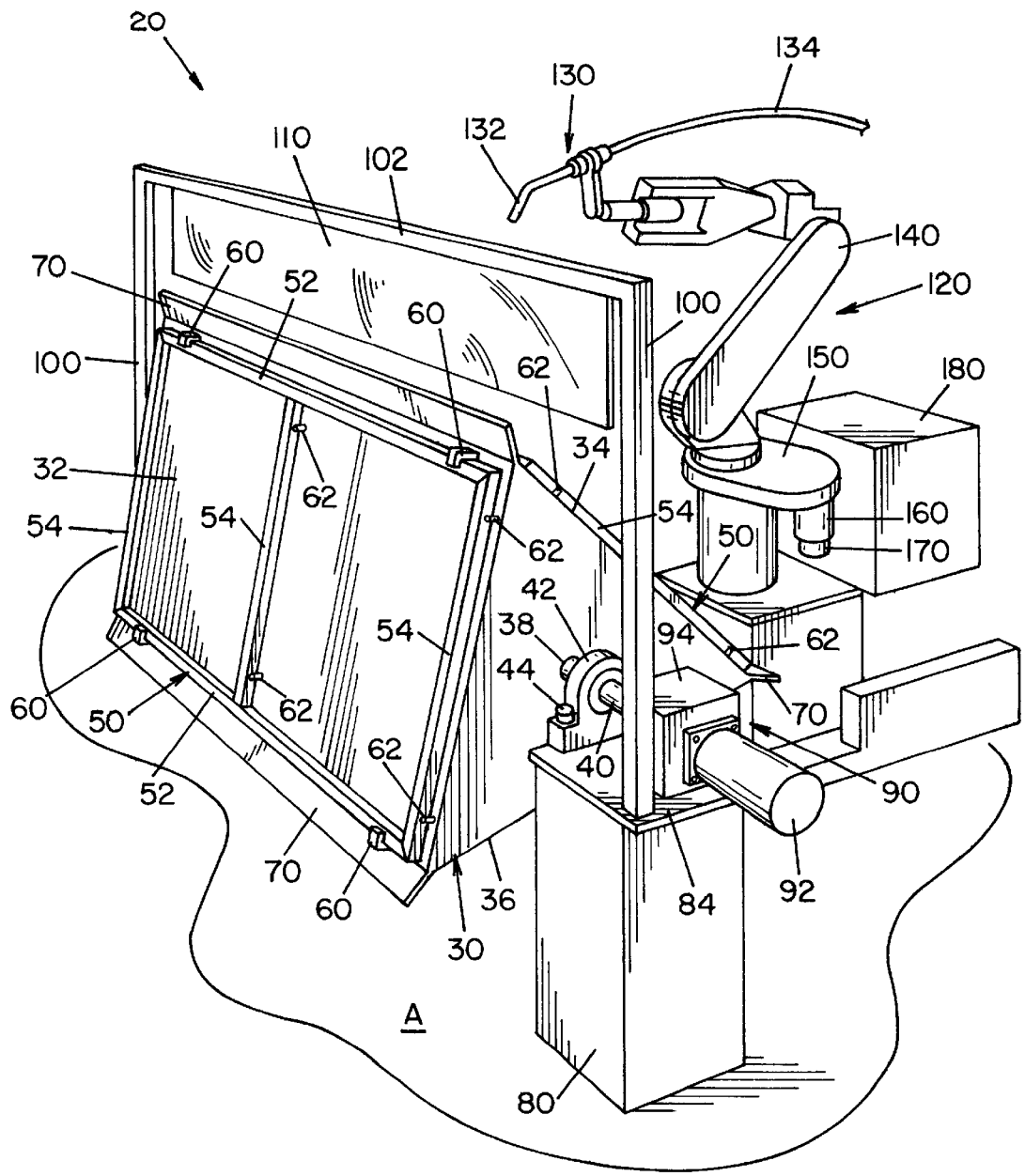
FIG. 1 is a perspective use view showing a welding system in accordance with the present invention.

Referring now to the drawings, wherein the showings are for the purpose of illustrating the preferred embodiments of the invention only, and not for the purpose of limiting the same, in FIG. 1 there is shown a robotic welding system 20, which includes a three-sided welding table 30 in accordance with the invention and as described in detail hereinafter. As seen in FIGS. 1 and 4–11, welding table 30 comprises three work surfaces 32, 34, 36, which form a triangular shaped welding table. Welding table 30 is connected to shaft 40. Shaft 40 extends along the central longitudinal axis of welding table 40 and through shaft opening 38 of welding table 30. Work surfaces 32, 34 and 36 are essentially identical in size and shape and are generally parallel to and equally spaced from shaft 40. Such a configuration forms a welding table 30 having a uniform cross-sectional shape of an equilateral triangle.

As shown in FIG. 1, a workpiece 50 is positioned on work surfaces 32 and 34. Workpiece 50 is a metal door frame comprised of two longitudinal rails 52 and three transverse rails 54. Longitudinal rails 52 are longer than transverse rails 54. Typically, longitudinal rails 52 are 5–7 feet long and transverse rails are 2–4 feet long. However, the longitudinal rails can be 100 feet or longer and the transverse rails can be 10 feet or longer. Workpiece 50 is secured to the work surfaces by brackets 60 and pins 62. Brackets 60 and pins 62 are positioned on the work surfaces to properly align the workpiece on the work surfaces. As shown in FIG. 1, two brackets are located at the top and bottom edges of the work surfaces. Brackets 60 have an L-shape component which are designed to secure longitudinal rails 52. Two pins 62 are located at the two sides of the work surface. Four additional pins 62 are positioned between the two sides of the work surface. The pins are designed to secure transverse rails 54 of the work surfaces. Additional pins or other clamping devices (not shown) may be used so as to secure both sides of all the transverse rails.

As best illustrated in FIG. 1, shield 70 is connected between the adjacent ends of work support surfaces 32, 34 and 36 and extend vertically from said ends thereof.

Figure 2:
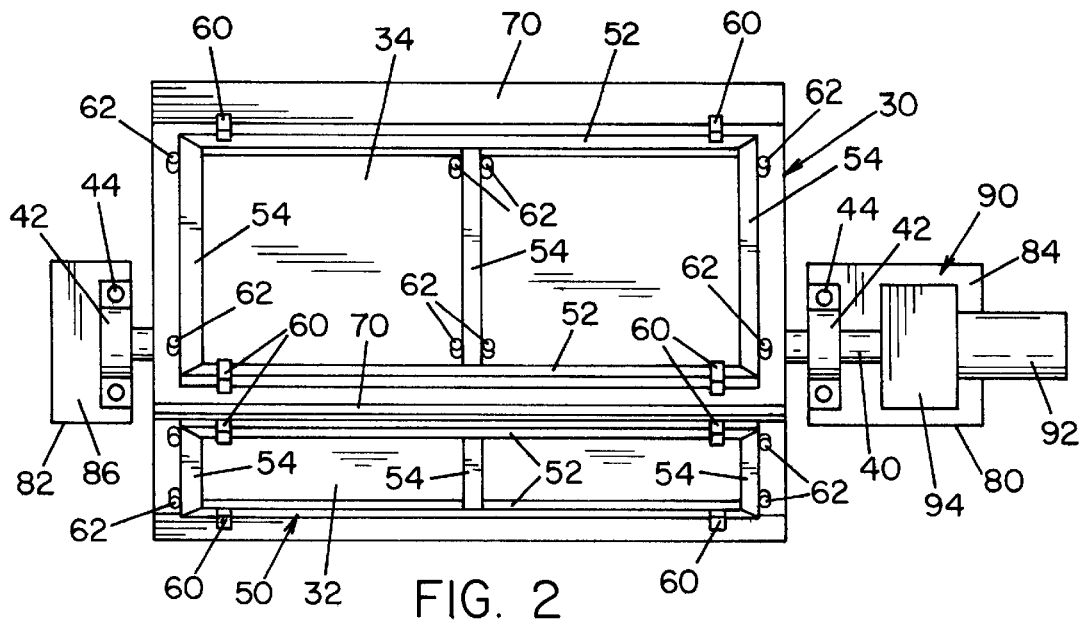
FIG. 2 is at top elevation view of a welding table of the welding system shown in FIG. 1.
Figure 3:
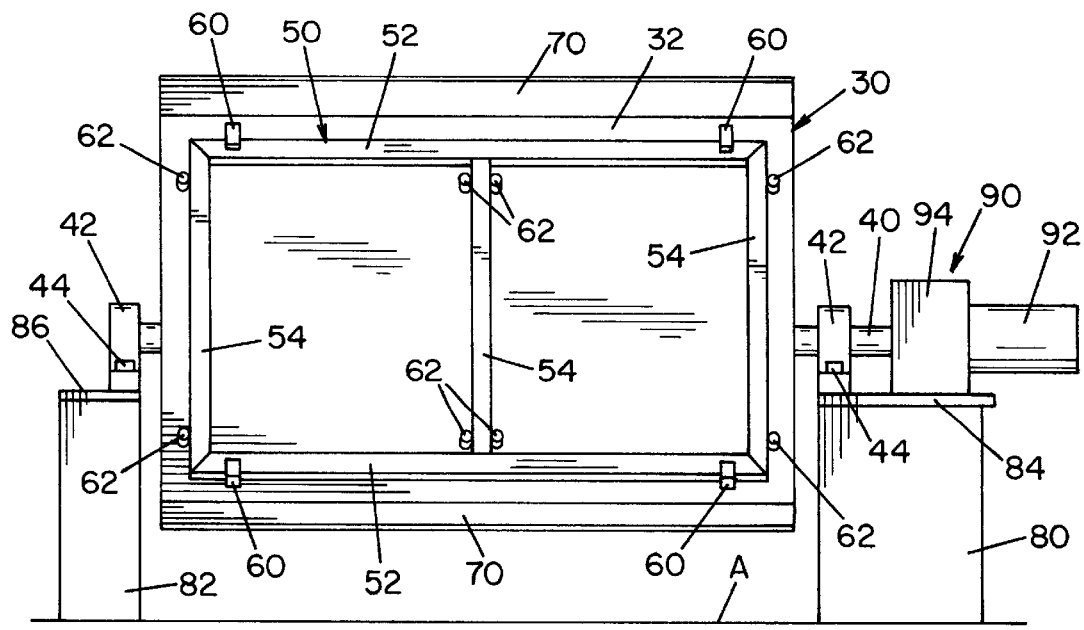
FIG. 3 is a front elevation view of the welding table of the welding system shown in FIG. 1.

Referring now to FIGS. 1–3, two shaft support bases 80 and 82 support shaft 40 above ground A. Shaft brackets 42 secure shaft 40 to base plates 84, 86 which in turn are secured to the support bases. Shaft brackets 42 are designed to allow shaft 40 to rotate. Shaft brackets 42 are secured to support bases by bracket bolts 44. Support bases 80 and 82 are designed to elevate shaft 40 a sufficient distance above ground A so that welding table 30 can be rotated on shaft 40.

Mounted on support base 80 is a drive unit 90 comprised of drive motor 92 and indexing drive mechanism 94. Drive unit 90 inter-engages with shaft 40 such that drive mechanism 94 selectively indexes shaft 40, thereby rotating work table 30.

Mounted vertically on base plates 84, 86 are vertical columns 100. Bridge rail 102 is mounted at the top ends of vertical columns 100. Bridge rail 102 supports a top shield 110.

Referring again to FIG. 1, a robotic welding system 120 is shown. Robotic welding system 120 includes a welder 130 having a welding head 132. Attached to welder 130 is a welding cable 134 which supplies gases, an electrode and/or a welding flux to welding head 132. Welder 130 is attached to a robotic arm 140. Robotic arm is designed to move welder 130 to and from workpiece 50 to weld the workpiece components together. Robotic arm 140 is supported on base 150. A robotic arm motor 160 and arm indexer 170 moves and controls the position of robotic arm 140. Power supply 180 supplies power to the welding station 120. A computer control (not shown) is used to control the operation of robotic arm 140, welder 130 and drive unit 90.

Figure 10:
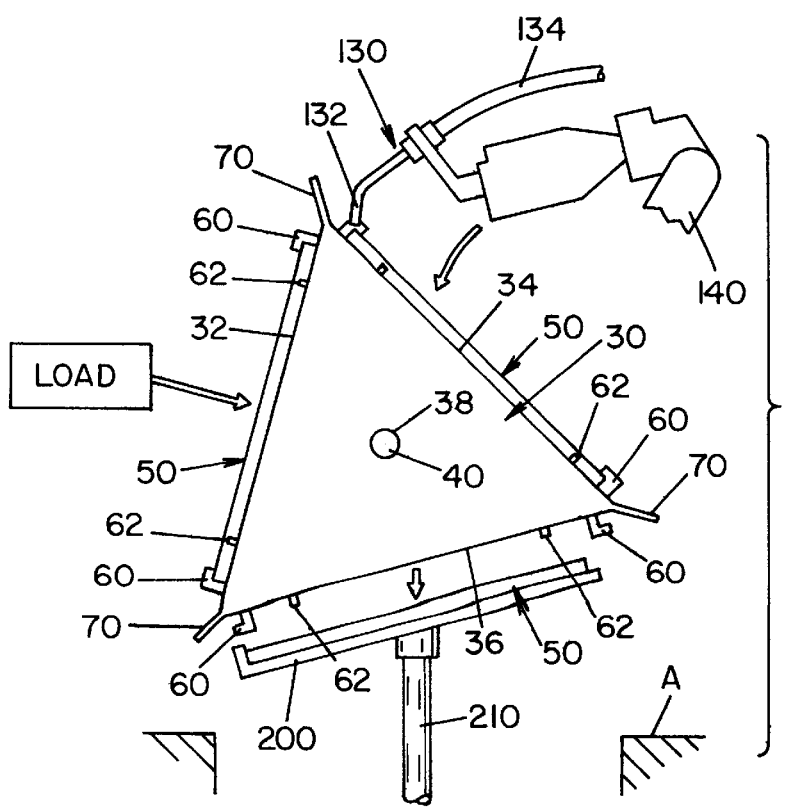
FIG. 10 is a schematic end elevation view of the welding table showing an alternative arrangement for unloading a workpiece from the welding table.
Figure 11:
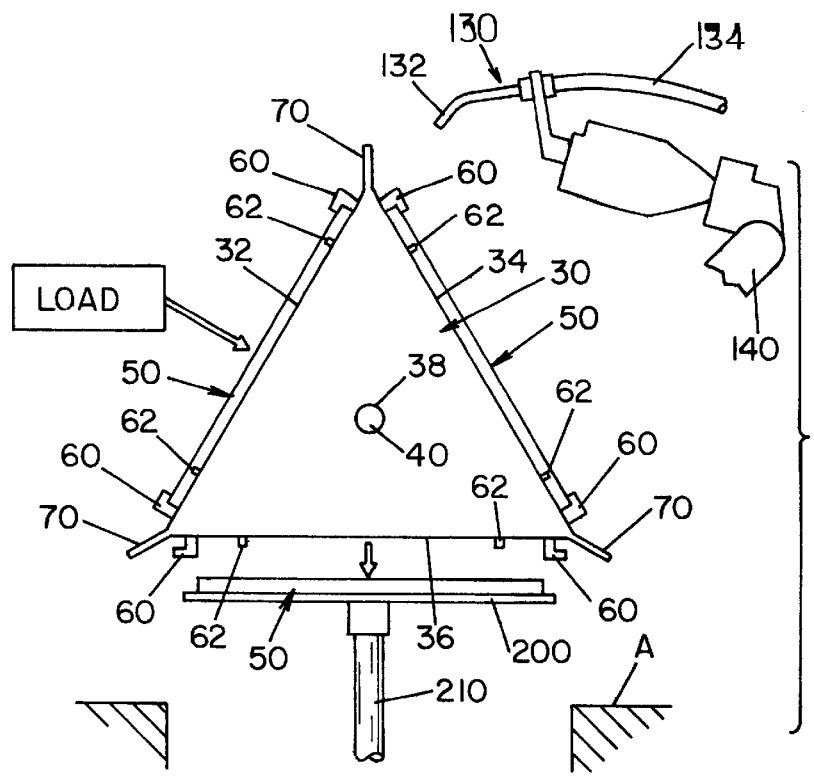
FIG. 11 is a schematic end elevation view of the welding table showing yet another alternative arrangement for unloading a workpiece from the welding table.

Referring now to FIGS. 10 and 11, a workpiece platform 200 is positioned under welding table 30. Workpiece platform 200 is designed to receive welded workpiece 50 from the work surfaces. A platform shaft 210 moves platform 200 toward and away from welding table 30. Platform 200 may be part of a conveyor system (not shown) to transport welded workpiece 50 from welding table 30.

Figure 4:
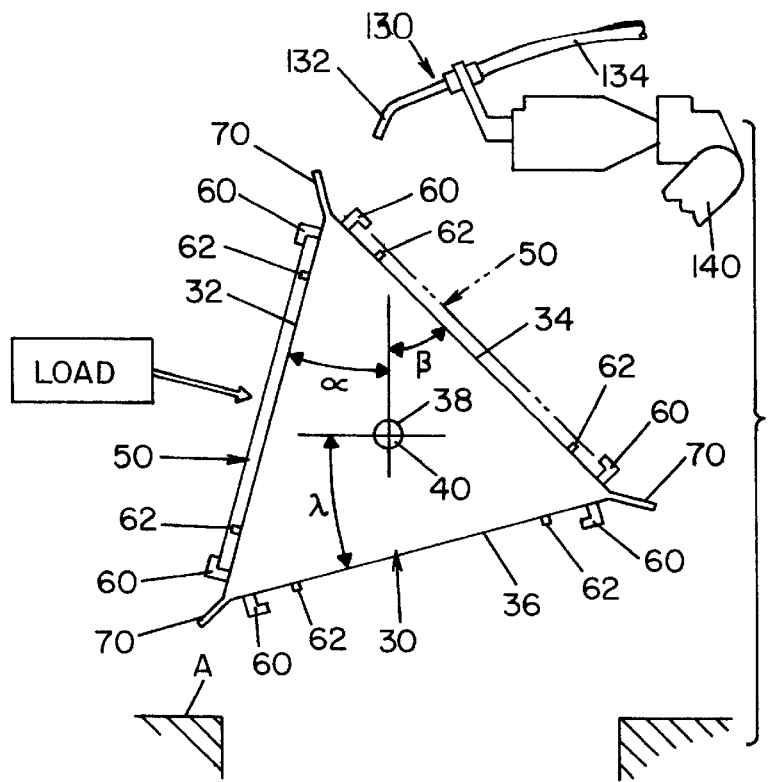
FIGS. 4–9 are schematic end elevation views of the welding table showing the loading, welding and/or unloading of a workpiece.

The operation of welding system 20 will now be described. Referring to FIG. 4, the components of workpiece are loaded on to work support 32 at the loading station. The components can be manually and/or automatically loaded onto the work surface. Preferably an operator, not shown, loads longitudinal and transverse rails 52 and 54 onto work surface 32 which are secured in position by brackets and pins 60 and 62. Work surface 32 is positioned at an angle offset from the vertical axis of welding table 30. Angle is preferably about 0–30° and more preferable 15°.

Figure 5:
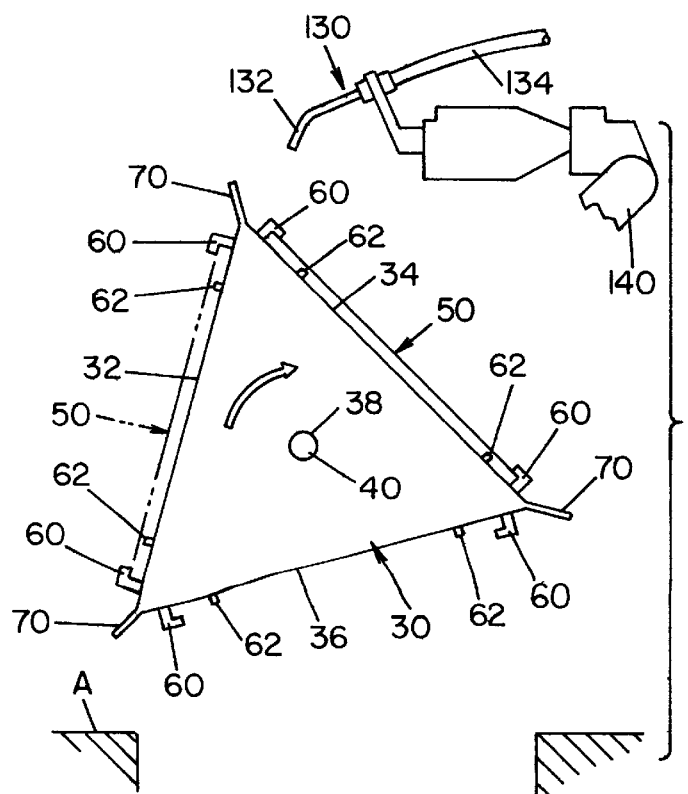

FIG. 4 also illustrates a workpiece on work surface 34 positioned at the welding station. Positioned above the workpiece is welder 130 which is attached to robotic arm 140. The workpiece on work surface 34 was moved from the loading station to welding station by welding table 30 being rotated by drive unit 90 as shown in FIG. 5. Work surface 34 is positioned at an angle β offset from the vertical axis of welding table 30. Preferably angle β is about 0–60° and more preferably about 45°.

FIG. 4 further illustrates work surface 36 positioned at the unloading station. A welded workpiece is not shown on work surface 36 since the welded workpiece has been manually and/or robotically removed from work surface 36. Work surface 36 is positioned at an angle λ offset from the horizontal axis of welding table 30. Preferably angle λ is about 0–30° and more preferably about 15°.

Referring to FIG. 5, drive unit 90 rotates work table 30 clockwise, when viewed from support base 80. The degree of rotation is controlled by indexing drive mechanism 94 and is complete when a work surface is indexed from the loading station to the weld station. Preferably, the drive mechanism rotates welding table 30 by one third of a revolution.

Figure 6:
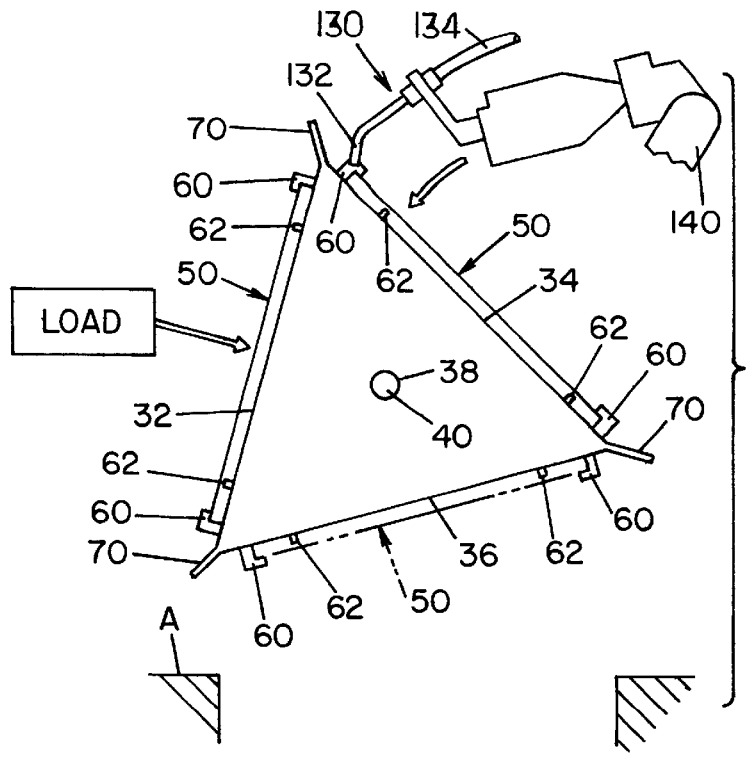
Figure 7:
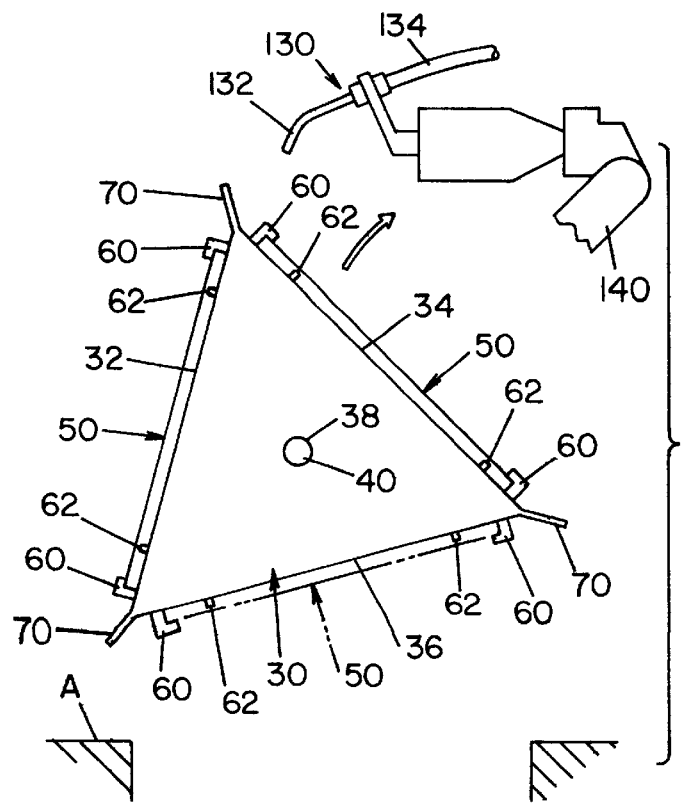

Referring to FIG. 6, once a work surface is in position at the weld station, welder 130 is indexed toward the workpiece and then performs the multiple welding operations on the workpiece to produce the welded door frame assembly. While welder 130 performs the welding operations, brackets 60 and pins 62 support the workpiece components. As shown in FIG. 6, a workpiece is loaded on to work surface 32 at the loading station while a workpiece on welding surface 34 is being welded at the welding station. Referring to FIG. 7, once welder 130 has completed welding workpiece 30, welder 130 indexes away from the workpiece so that work surface 34 is clear for rotation.

Figure 8:
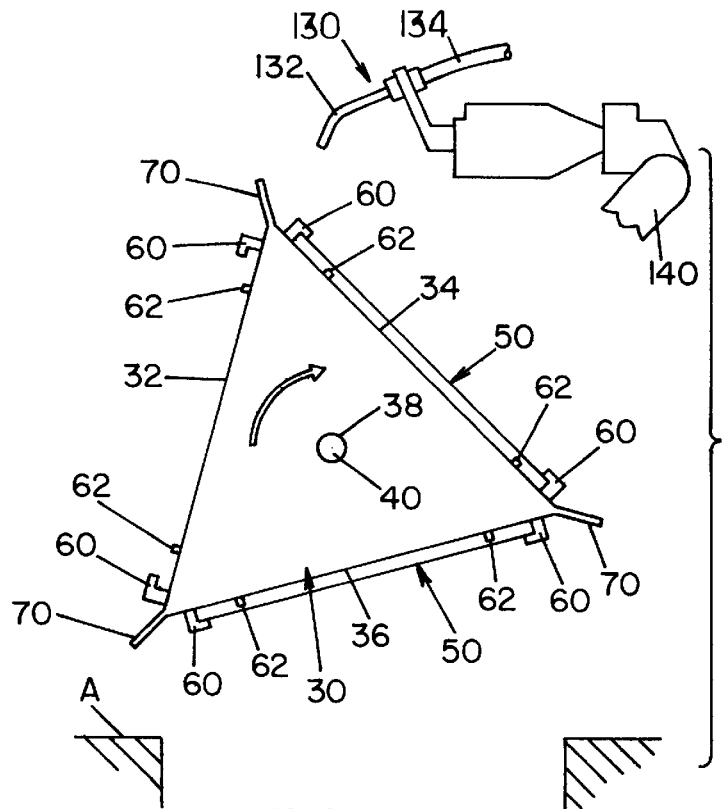

Referring to FIG. 8, once welder 130 has cleared the rotational path of welding table 30, drive unit 90 rotates welding table 30 clockwise to move the welded workpiece from the welding station to the unloading station, the non-welded workpiece from the loading station to the welding station, and the unloaded work surface from the unloading station to the loading station to be loaded with components of the workpiece. The degree of rotation is controlled by indexing drive mechanism 90. Preferably, the welding table is rotated about 120°.

Figure 9:
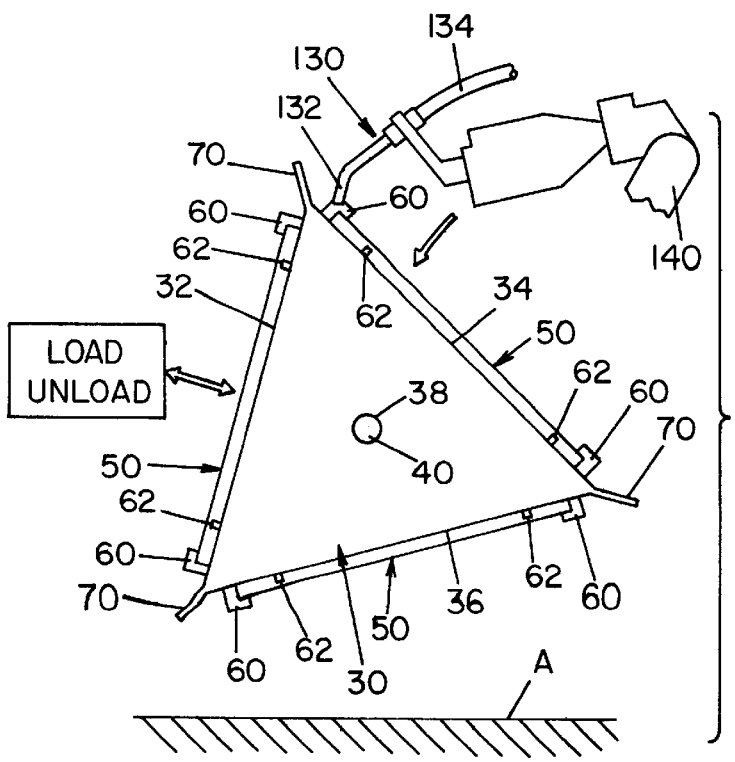

Referring now to FIG. 9, the unloading station and loading station are positioned at the same location. The welded workpiece is unloaded from the work surface and the non-welded workpiece components are then loaded onto the work surface.

Referring now to FIG. 10, three operations are performed together. At the loading station, non-welded workpiece components are loaded onto work surface 32, the workpiece components on work surface 34 are welded by welder 130 at the welding station, and the welded workpiece is unloaded, manually or automatically, from work surface 36 at the unloading station. At the unloading station, a workpiece platform 200 is shown to be movable toward work surface 36 by platform shaft 210 to receive the welded workpiece. Work surface 36 is offset from the horizontal axis of work table 30 at about 15°. Workpiece platform 200 is tilted at an angle substantially the same as the angle of work surface 36.

Referring now to FIG. 11, drive mechanism 94 indexes welding table 30, after the welding process is completed at the welding station, to move work surface 36 at an offset angle of about 0° from the horizontal axis of the welding table. Once welding surface 36 is positioned, the welded workpiece is positioned, manually or automatically, onto substantially flat workpiece platform 200.

In another preferred embodiment, the drive mechanism rotates the welding table about 15° after the workpiece is welded at the work station so as to position the work surface at this unloading station at an angle of about 0° from the horizontal axis. Once the workpiece is unloaded, the drive mechanism rotates the work table about 105° to move the unloaded work surface to the loading station and the just loaded work surface to the welding station and the just welded workpiece to a transition position at the unloading station. The drive mechanism, drive motor and shaft brackets are mounted outwardly from the ends of the welding table to allow easy access thereto for maintenance thereof. By positioning the work surfaces about a longitudinal axis, floor space is reduced. The work surfaces are indexed over the top of each other. The required floor space is equal to approximately the area of one workpiece, or a side of the welding table. Furthermore, the welding table allows for easy access to a work surface while a separate work surface is in position for welding at the welder station. The welding table also moves the workpiece to the robotic welder and the welded workpiece to the unloading station, thereby reducing operator fatigue and idle time. Furthermore, rotating about a longitudinal axis, each work surface, after passing the welding station, rotates such that it faces generally down before rotating back to the operator's workstation. When the work surface is in downward position, a simple unloading mechanism can be incorporated to unload the welded workpiece.

The invention has been described with reference to a preferred embodiment and alternates thereof. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

Having thus described the invention, it is so claimed:

1. A method of welding components of a workpiece together comprising the steps of:

(a) providing a welding table adapted to support the components of said workpiece, said welding table including a first, second and third work surface;

(b) providing a loading station to load said workpiece components onto at least one work surface, a welding station to weld together said workpiece components, and an unloading station to unloaded said welded workpiece from at least one work surface;

(c) rotating said welding table about a longitudinal axis to move said first work surface to said loading station, said first work surface at said unloading station being offset from a vertical axis of said structure at about 0–90°;

(d) loading said workpiece components onto said first work surface at a loading station;

(e) securing said workpiece components onto said first work surface at said loading station;

(f) rotating said structure about said longitudinal axis to move said first work surface from said loading station to said welding station, said first work surface at said welding station being offset from said vertical axis at about 0–60°;

(g) positioning a welder onto said workpiece in a preselected manner to weld said workpiece components together at said welding station;

(h) rotating said welding table about said longitudinal axis to move said first work surface from said welding station to said unloading station, said first workpiece support surface at said unloading station being offset from said longitudinal axis at about 0–30°; and (j) unloading said welded workpiece from said first work surface at said unloading station.

2. In a welding system adapted to weld a workpiece together comprising a welding table to support and move said workpiece between a loading station and a welding station, and a welder adapted to weld together said workpiece at said welding station, said improvement comprising said welding table including at least a first, second and third work surface, a rotating mechanism adapted to rotate said welding table in substantially one direction about a longitudinal axis extending generally parallel to said work surfaces and substantially at the center of said welding table, and an index mechanism adapted to index said welding table about said longitudinal axis to position said first work surface from said loading station to said welding station.

3. A welding system as defined in claim 2, wherein said welding table has three work support surfaces and a generally uniform triangular cross-sectional shape along the longitudinal axis of said welding table, said work surfaces being spaced at substantially equal distances about said welding table.

4. A welding system as defined in claim 2, wherein said index mechanism positions each of said work support surfaces at said welding station at about a 0–60° offset from a vertical axis of said welding table.

5. A welding system as defined in claim 2, wherein said index mechanism positions each of said work support surfaces at said loading station at about a 5–9° offset from a vertical axis of said welding table.

6. A welding system as defined in claim 2, wherein said welding table includes a shield to reduce the amount of spatter transversing from said welding station to another station, said shield positioned substantially at an intersecting end of two adjacent work surfaces.

7. A welding system as defined in claim 2, including a shielding structure positioned above said welding table and adapted to reduce the amount of spatter transversing from said welding station to other stations.

8. A welding system as defined in claim 2, wherein said welding table includes a clamping mechanism adapted to secure said workpiece to each of said work surfaces.

9. A welding system as defined in claim 2, including a robotic welder and a welding index mechanism adapted to position a welding device on said robotic welder at predefined locations on said workpiece after said workpiece is positioned at said welding station.

10. A welding system as defined in claim 2, including an unloading station, said loading station, said welding station and said unloading station being positioned at distinct locations about said welding table, said index mechanism adapted to index said welding table to position said first work surface from said welding station to said unloading station.

11. A welding system as defined in claim 10, wherein said index mechanism positions each of said work surfaces at said unloading station at about a 0–30° offset from said longitudinal axis.

12. A welding system as defined in claim 10, wherein said welding table includes a clamping mechanism adapted to secure said workpiece to each of said work surfaces at said loading station and welding stations and to release said workpiece from each of said work surfaces at said unloading station.

13. A welding system as defined in claim 10, including a conveyor mechanism adapted to receive said workpiece at said unloading station.

14. A welding system as defined in claim 13, wherein said conveyor mechanism includes a workpiece receiver adapted to move toward said work surface at said unload station to receive said workpiece.

15. A welding table for supporting and moving a generally flat workpiece between a loading station and a welding station, said welding table comprising a three sided frame having first, second and third generally flat work surfaces arranged in a generally equilateral triangle, means for rotatably mounting said frame about a longitudinal axis extending parallel to said work surfaces at the center of said triangle, and means for indexing said first surface from said loading station to said welding station.

16. A welding table as defined in claim 15, wherein said means for indexing positions at least one of said support surfaces at said loading station at a 0–90° offset from a vertical axis of said structure.

17. A welding table as defined in claim 15, including means for clamping to secure said workpiece to at least one of said work surfaces as said frame is moved from said loading station to said welding station.

18. A welding table as defined in claim 15, including a means for shielding to reduce the amount of spatter and/or arc flash created at said welding station from traversing to other stations, said means for shielding positioned substantially at an intersecting end of two adjacent work surfaces.

19. A welding table as defined in claim 15, wherein said means for indexing positions at least one of said support surfaces at said welding station at about 0–60° offset from a vertical axis of said frame.

20. A welding table as defined in claim 19, wherein said offset angle is about 45°.

21. A welding table as defined in claim 15, including means for indexing positions at least one of said work surfaces from said welding station to an unloading station, said work surface at said unloading station offset from said longitudinal axis at about 0–30°.

22. A welding table as defined in claim 21, including a means for clamping to secure said workpiece to at least one of said work surfaces at said welding station and to release said workpiece from said work surface at said unloading station.

23. A welding table as defined in claim 21, including a means for clamping to secure said workpiece to at least one of said work surfaces at said welding station and to release said workpiece from said work surface at said unloading station.

24. A welding table as defined in claim 23, including a means for shielding to reduce the amount of spatter and/or arc flash created at said welding station from traversing to other stations, said means for shielding positioned substantially at an intersecting end of two adjacent work surfaces.

25. A welding table as defined in claim 15, wherein said means for rotatably mounting rotates said frame in substantially a single direction about said longitudinal axis.

26. A welding table as defined in claim 25, wherein said means for indexing positions at least one of said support surfaces at said welding station at about 0–60° offset from a vertical axis of said frame.

27. A welding table as defined in claim 26, wherein said means for indexing positions at least one of said support surfaces at said loading station at a 0–90° offset from a vertical axis of said structure.

28. A welding table as defined in claim 27, wherein said means for indexing positions at least one of said work surfaces from said welding station to an unloading station, said work surface at said unloading station offset from said longitudinal axis at about 0–30°.

29. A welding table as defined in claim 28, including means for clamping to secure said workpiece to at least one of said work surfaces as said frame is moved from said loading station to said welding station.

30. A welding table for supporting and moving a workpiece between a loading station and a welding station, said welding table comprising at least a first, second and third work surfaces, a rotating mechanism adapted to rotate said work surfaces about a longitudinal axis of said welding table, said longitudinal axis extending generally parallel to said work surfaces, and an index mechanism adapted to index said work surfaces about said longitudinal axis to position said first work surface from said loading station to said welding station.

31. A welding table as defined in claim 30, wherein said rotating mechanism rotates said work surface in substantially a single direction about said longitudinal axis.

32. A welding table as defined in claim 30, including a clamping mechanism adapted to secure said workpiece to at least one of said work surfaces.

33. A welding table as defined in claim 30, including a shield position between at least two of said work surfaces, said shield adapted to reduce spatter and/or arc flash formed at said welding station from adversely affecting other stations.

34. A welding table as defined in claim 30, wherein said index mechanism positions said first work surface at said welding station at about a 0–60° offset from a vertical axis of said welding table.

35. A welding table as defined in claim 34, wherein said offset angle is about 30–50°.

36. A welding table as defined in claim 30, wherein said index mechanism positions said first work surface at said loading station at about 0–90° offset from a vertical axis of said welding table.

37. A welding table as defined in claim 36, wherein said offset angle is about 10–40°.

38. A welding table as defined in claim 30, wherein said index mechanism indexes said work surfaces about said longitudinal axis to position said first work surface from said welding station to an unloading station.

39. A welding table as defined in claim 38, wherein said index mechanism positions said first work surface at said unloading position at about a 0–30° offset from said longitudinal axis.

40. A welding table as defined in claim 38, including a clamping mechanism adapted to release said workpiece at said unloading station.

41. A welding table as defined in claim 30, wherein said welding table has a generally uniform triangular cross sectional shape along the longitudinal axis of said welding table, and said three work surfaces being spaced at substantially equal distances about said work table.

42. A welding table as defined in claim 41, wherein said rotating mechanism being connected to said work table along said longitudinal axis passing generally through the center of said triangular cross section of said work table.

43. A welding table as defined in claim 42, wherein said rotating mechanism rotates said work surface in substantially a single direction about said longitudinal axis.

44. A welding table as defined in claim 43, wherein said index mechanism positions said first work surface at said welding station at about a 0–60° offset from a vertical axis of said welding table.

45. A welding table as defined in claim 44, wherein said index mechanism positions said first work surface at said loading station at about 0–90° offset from a vertical axis of said welding table.

46. A welding table as defined in claim 45, wherein said index mechanism indexes said work surfaces about said longitudinal axis to position said first work surface from said welding station to an unloading station.

47. A welding table as defined in claim 46, including a clamping mechanism adapted to secure said workpiece to at least one of said work surfaces.

48. A welding table as defined in claim 47, including a clamping mechanism adapted to release said workpiece at said unloading station.

49. A welding table as defined in claim 48, including a shield position between at least two of said work surfaces, said shield adapted to reduce spatter formed and/or arch flash at said welding station from adversely affecting other stations.

* * * * *